Patented Aug. 15, 1939

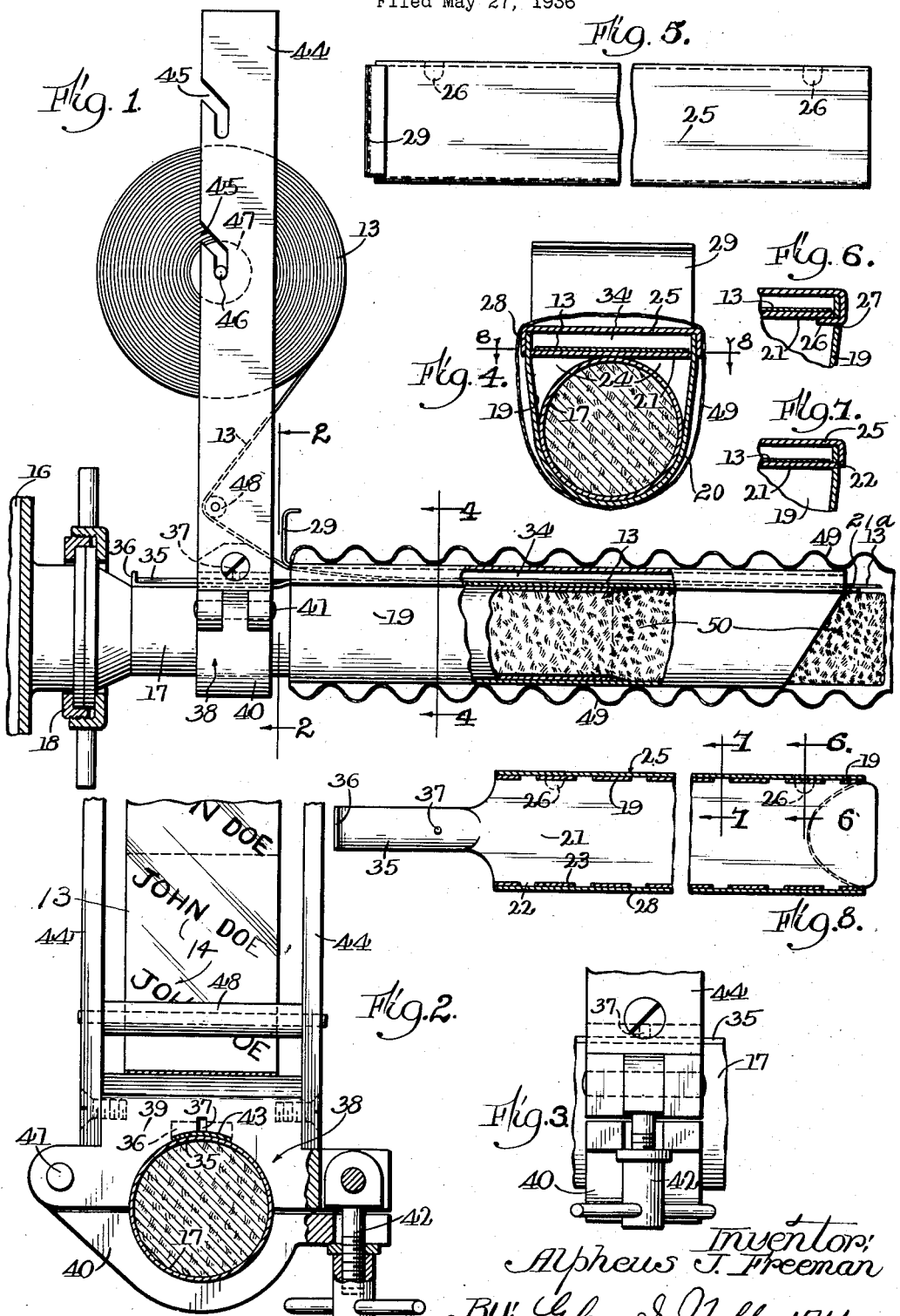

2,169,412

UNITED STATES PATENT OFFICE 2,169,412

APPARATUS FOR MARKING FOOD PRODUCTS

Alpheus J. Freeman, Chicago, Ill., assignor to Freeman, Incorporated, Chicago, Ill., a corporation of Illinois Application May 27, 1936, Serial No. 82,041

15 Claims. (Cl. 17—41)

This application is in part a continuation of my co-pending application for Food marking and reinforcing, filed March 4, 1935, Serial No. 9,282.

In accordance with my previous inventions I have devised a method of marking food products stuffed in casings, such as sausage, cheese, meat, or other food product, by inserting a name strip, tape, or the like, between the casing and the filling, it being intended that such strip or the reading matter thereon be visible through the casing.

The present invention relates to means for inserting the marking strip or member as the casing is being stuffed with the filling material. More specifically it relates to a stuffer horn and means coacting therewith for guiding and feeding the tape or strip into the casing during the stuffing operation. It is well known that ordinary casings such as those of animal origin or artificial casings, when soaked or wet for stuffing, are slippery and difficult to handle and it becomes difficult to insert or position a marking strip between the inner surface of the casing and the soft filling material as the casing is being filled. In filling large casings there is also a tendency for the filling strip to sink down into the filling material or to be partially covered thereby so that it is not pressed closely against the casing and in fact may be entirely surrounded by the filling material and consequently to lose its value as a marking element.

The principal object of this invention is to provide means for feeding or guiding a marking strip into a casing or covering of the kind indicated while the casing is being filled, whereby the strip will be firmly pressed against the inner surface of the casing and will be held thereagainst by the sausage or filling material.

Other objects are to provide an improved filler horn with guide means for guiding a marking strip or the like lengthwise of the same; to provide a filler horn with an auxiliary horn or casing having a guideway therein and providing means for the escape of air; to provide a filler horn or the like with a bracket for supporting a roll of marking or reinforcing material and with guide means for guiding said material longitudinally of the horn; to provide means for causing the meat or filling material to contact with the marking strip and press it against the casing; to provide a guideway having a readily removable cover; to provide convenient means for severing the marking strip; and to provide such other improvements in construction and advantages in operation as will appear more fully hereinafter.

In the accompanying drawing illustrating this invention:

Figure 1 is a view partly in section showing a stuffing machine and horn embodying my improvements for inserting the reinforcing or marking material on the inside of the casing as the casing is being filled;

Figure 2 is a sectional view taken on the line 2—2 of Figure 1;

Figure 3 is a side view of the clamp shown in Figure 2;

Figure 4 is a sectional view taken on the line 4—4 of Figure 1;

Figure 5 is a plan view of the auxiliary horn or casing and guide strip;

Figure 6 is a sectional detail taken on the line 6—6 of Figure 8;

Figure 7 is a sectional detail taken on the line 7—7 of Figure 8; and

Figure 8 is a sectional view taken on the line 8—8 of Figure 4.

As shown in this drawing, 13 illustrates any suitable marking strip, tape, or the like, formed of either edible or non-edible material which may be utilized for marking or reinforcing of food products, such as sausages or the like. This strip may conveniently be supplied in a roll as shown in Figure 1, and contains any suitable printing such as the trade mark or trade name of the manufacturer, as shown at 14, such mark being preferably repeated at frequent intervals so that it will be readily and plainly visible when applied to the goods. This relatively wide strip is intended to be used with sausages or the like of large diameter as compared with wienerwursts or smaller sausages. Such strip may be made of any material suitable for the purposes indicated and may be formed of an edible product of a cellulose nature and printed with edible ink or marking material so that it will not be detrimental to the goods and will also pass Government inspection. Such strips, tapes, cords or strings, as heretofore described in my prior application, not only serve for marking the goods for identification purposes, but the cords or strings may also serve for reinforcement and for ripping open the casings when the sausage is to be eaten.

The stuffing machine or stuffer 16 indicates any machines of this kind ordinarily used for stuffing purposes and is provided with a filler horn 17 which is detachably secured to the outlet of the machine by means of the usual coupling 18. Horns such as the one shown are made in various sizes, depending upon the nature of the sausage to be manufactured, or other products to be inserted in the casing.

The horn 17 is provided with tape or ribbon guide means designated generally by the numeral 19. This means as shown comprises an auxiliary horn made of any desired cross section but preferably comprises a lower semicylindrical portion 20 which conforms to the shape of the horn 17, which is usually circular in cross section. The tape or ribbon guide means 19 has a flat top wall 21 which is of approximately the width of the tape or strip 13 which is to be introduced into the casing. The tape or ribbon guide means 19 may be made in any suitable manner; but in the present instance the top plate or wall 21 is provided with tongues or projections 22 which fit in holes 23 in the sides of the tape or ribbon guide means and which may be riveted or otherwise secured therein. This leaves open spaces or passageways 24 between the stuffer horn and the tape or ribbon guide means which permit the escape of air therethrough during the stuffing operation, such air also being permitted to escape through the passageway for the tape or ribbon 13. The sides of the tape or ribbon guide means 19 extend upwardly beyond the top wall or plate 21. A cover 25 is provided for the top passageway, which may be attached thereto in any suitable manner but which is shown as being removable, being hinged on integrally formed projections 26 which engage with holes 27 in the upwardly extending side of the tape or ribbon guide means as shown in Figure 6, and the opposite side of the cover has a flange 28 which fits closely over the opposite side of the tape or ribbon guide means and is held in position by friction. The cover 25 extends approximately the full length of the tape or ribbon guide means 19 and has an upwardly projecting handle or guide portion 29 at the inner end which serves for removing the cover and also as a guide for the tape as shown in Figure 1. It will be noted that this construction is such that a rectangular space 34 is provided at the top of the tape or ribbon guide means through which the tape or ribbon 13 passes as shown particularly in Figure 4.

The top wall or plate 21 of the tape or ribbon guide means has a tang or narrow extension 35 which extends along the top of the horn 17 and has an upwardly extending flange 36 at the end thereof and which is also provided with a pin or projection 37 to assist in holding it in position, as will presently be described.

A clamp 38 engages with the horn 17 adjacent to the inner end as shown in Figure 1, and serves to clamp the tape or ribbon guide means 19 in position and also to support a bracket for the roll of tape. This clamp has an upper portion 39 and a lower portion 40 which is hinged thereto at 41 and which is held in clamping position by an adjusting screw 42 as will be seen from Figure 2. The upper portion 39 has a recess 43 for receiving the tang or projection 35 which is clamped between the upper portion and the horn 17. The pin 37 engages with a slot in the clamp which extends longitudinally of the horn and serves to prevent the turning or twisting of the tape or ribbon guide means with respect to the stuffer horn. The flange 36 is adapted to engage with the side of the clamp to prevent the longitudinal displacement of the tape or ribbon guide means while permitting the longitudinal adjustment of the same with respect to the stuffer horn.

The clamp 38 has upwardly extending sides or bars 44 having slots or notches 45 which furnish bearings for a shaft or pin 46 of a roller 47 which carries the roll of ribbon or tape 13. This roll bracket also has a guide roller 48 adjacent to the lower portion for guiding the tape or ribbon 13 as it passes from the roll to the tape or ribbon guide means 19.

The filler horn 17 is preferably made somewhat shorter, as about two inches, than the tape or ribbon guide means 19 as shown particularly in Figure 1, for purposes which will presently be explained. The extreme end of the tape or ribbon guide means 19 is also preferably cut away or slanted backwardly from the end of the guideway as shown in Figures 1 and 8 for purposes which will also be presently explained. The top plate 21 also preferably extends a short distance beyond the end of the guideway 34 as shown at 21ª.

When the apparatus is to be used, the roll of tape or ribbon 13 is placed in position, as shown in Figure 1, and drawn over the guide roller 48 and through the guideway 34 and extended out somewhat beyond the end of the guideway. During this step the cover 25 is preferably removed. The casing 49 is gathered on the tape or ribbon guide means 19 in the same manner as it would ordinarily be arranged on the filler horn preparatory for filling. Ordinarily the operator will grasp the outer end of the casing 49 and the projecting end of the strip 13 preparatory for the filling operation. When the sausage or filling material 50 begins to emerge from the end of the inner horn it will slightly expand or spread out to fill the outer end of the tape or ribbon guide means as indicated in Figure 1. When the filling material 50 begins to emerge from the tape or ribbon guide means the marking strip 13 is carried along with the casing and is pressed closely against the inner surface of the casing by the filling material, the casing of course sliding off from the tape or ribbon guide means in the usual manner during the stuffing operation. Since the stuffer horn or tube 17 projects less than the tape or ribbon guide means 19, the meat or filling is caused to be shaped or to conform to the outer tube with a flattened upper surface which carries the tape 13 out substantially flat, whereby it is pressed against the inner surface of the case without wrinkling. The slanting or cutting back of the end of the tape or ribbon guide means 19 allows pressure of the meat or filling material to be built up in the casing when starting, causing the strip or tape 13 to be held in proper position, particularly during the starting movement and also permitting the casings to be stuffed tightly as is desired. The short extension 21ª takes away the direct pressure of the meat against the marking strip at the point of discharge and allows the strip to flow freely into position without danger of breaking the same. The outer end of this extension also provides an edge or blade for tearing or severing the marking strip at the end of the filling operation.

During the filling operation any air which may be entrapped in the casing is free to pass out through the passageway 34 and thus prevent undue pressure on the casing.

If the product being manufactured is of the linked type, such as pork sausage or frankfurters, the casing is run out and filled as above described, and the links then formed by twisting in the usual manner. In sausages of this kind the marking and reinforcing strip is continued throughout the length of the connected links and serves to reinforce the same, particularly at the twists, so that the casings are not apt to be broken at the joints or to fall down when being hung for storage, smoking, or the like.

If bungs or large casings are to be filled the operation is the same as described with the exception that after the bung has been filled the ends are gathered together and tied in the usual manner. In this form of sausage the marking strip 13 is preferably carried out through the gathered ends of the casing and tied therein, thus reinforcing the casing. The marking and reinforcing strip 13 will be pressed closely against the casing 49 so that the words or marking thereon will be readily visible through the transparent or semitransparent material of the casing.

Although sausage stuffed in casings has been known and used for many years, it has been found difficult and more or less commercially unsuccessful to properly mark or identify the same. The so-called "natural" casings formed of animal tissue is of such a nature that it is practically impossible to print the same, as is readily apparent to those familiar with the character of such material. While some success has been made in printing so-called "artificial" casings or those made of cellulose material, it has been found that such "artificial" casings tend to dry out or deteriorate quite rapidly, so that they are apt to crack during the stuffing operation. I have also discovered that the printing of such artificial casings, which requires drying of the printing, also appears to tend to injure the casings due to the necessity of drying after the printing operations, so that the printed casings are more apt to crack than the unprinted ones. Furthermore, the printing of the artificial casings is apt to become blurred or rubbed off during the soaking, filling or smoking operations, which requires considerable handling of the same. While various efforts have been made to provide satisfactory marking for indicating the source of manufacture of sausages, I believe that I am the first to provide any operative means for inserting indicating strips or placing inserts in the casings during the filling operation whereby such inserts cannot be removed without destroying the filled casings.

From this description it will be seen that I provide a simple and efficient apparatus which has been found satisfactory in actual use for inserting marking strips in casings as above described, but it will also be apparent that changes may be made to adapt the same for different types of sausages or other products, and therefore I do not wish to be limited to the construction herein shown and described other than as set forth in the following claims, in which I claim:

1. The combination with a stuffer having a filler horn, of an auxiliary casing supporting member operatively associated with said horn, said member being provided with a guideway for the passage of indicating tape for the purposes described.

2. The combination with a filler horn for a sausage making machine, of tape or ribbon guide means extending longitudinally thereof and having a closed passageway for a strip of tape to be fed into the casing being stuffed by means of the horn.

3. The combination with a stuffer having a filler horn, of tape or ribbon guide means adapted to be positioned over said horn and having a longitudinal passageway therethrough, and means for supporting a roll of tape or the like whereby the tape may be directed through said passageway to be carried along by the material being acted upon.

4. The combination with a stuffer horn, of an auxiliary tubular member engaging therewith and having a passageway longitudinally thereof, a cover for said passageway, a clamp engaging with said horn and with the auxiliary member for clamping said member to the horn to hold it in position thereon, a bracket carried by said clamp, and a roll in the bracket for supporting a marking strip.

5. An apparatus of the character set forth comprising a stuffer horn, a guideway extending longitudinally thereof, said horn and guideway serving to hold a casing preparatory for stuffing the same, and means for supporting a strip adjacent to the guideway whereby the strip may be passed from the support through said guideway to be fed out with the casing and stuffing material.

6. In an apparatus of the character set forth, the combination of a stuffer horn, a tape guide means enclosing said stuffer horn with its discharge end extending beyond the end of the stuffer horn, and having a rectangular guideway in one side thereof, said guideway serving as a passageway through which an indicating strip may be fed.

7. The combination with a stuffer horn, of ribbon guide means adapted to be applied thereto and having a substantially rectangular closed passageway extending longitudinally thereof, said ribbon guide means including an outer horn the discharge end of which is sloped backwardly from the end of the passageway.

8. The combination with a stuffer horn, of ribbon guide means adapted to be fitted thereover, said ribbon guide means being curved on one side and flat on the other with a channel extending along the flat side, a detachable cover for said channel, the wall forming the flat side extending beyond the end of the ribbon guide means to protect the marking strip which may be passed through said channel.

9. In a device for the purposes set forth, the combination with a stuffer horn, of tape or ribbon guide means fitting over said stuffer horn and extending beyond the discharge end thereof, said tape or ribbon guide means having a flat top wall provided with a rearwardly extending tang, said tape or ribbon guide means also having a longitudinal channel at the top thereof, a detachable cover for said channel, a bracket engaging with the stuffer horn and said tang for holding the tape or ribbon guide means in position, and means carried by said bracket for supporting a roll of tape or the like, the arrangement being such that the tape may be directed from said roll through said channel to be interposed between the casing and the filling as described.

10. A device as per claim 9 in which the tape or ribbon guide means includes a horn portion the top wall of which extends beyond the end of the channel and the discharge end of said horn portion is slanted backwardly away from the end of the channel.

11. A device as per claim 2 in which the bottom wall of the guide means extends a sufficient distance to provide means for severing the strip.

12. A filler horn of the character set forth having a guideway through which an insert may be passed, the end of the guideway having means for tearing or severing the insert.

13. Means for filling casings with food products or the like, including insert tape guiding means comprising a covered passageway along the filling means through which the insert tape will pass during the filling operation.

14. A stuffer horn or the like for filling casings with food products, having a longitudinal covered guideway which is positioned within the casing to be filled and which provides a passageway through which an identifying tape insert may be introduced into the casing being filled.

15. A casing and strip feeder comprising a nozzle for the filling material and covered tape or ribbon guide means for a strip, arranged adjacent thereto so that a casing may be applied over both the nozzle and said guide means and the tape or ribbon will be kept dry while passing through said guide means.

ALPHEUS J. FREEMAN.